Figure 11:
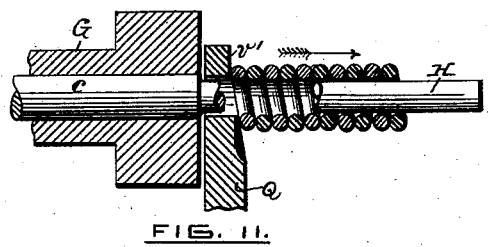

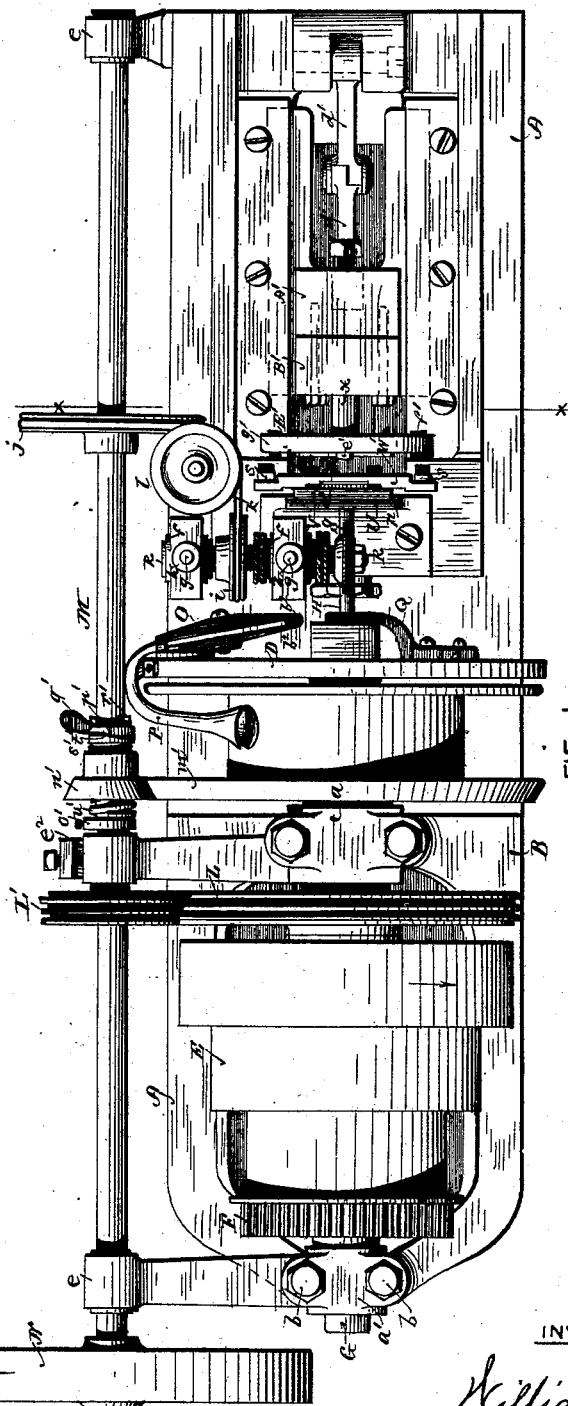

(No Model.) 4 Sheets—Sheet 2.
W. A. PECK.
MANUFACTURE OF RINGS OR CHAIN LINKS.
No. 367,923. Patented Aug. 9, 1887.
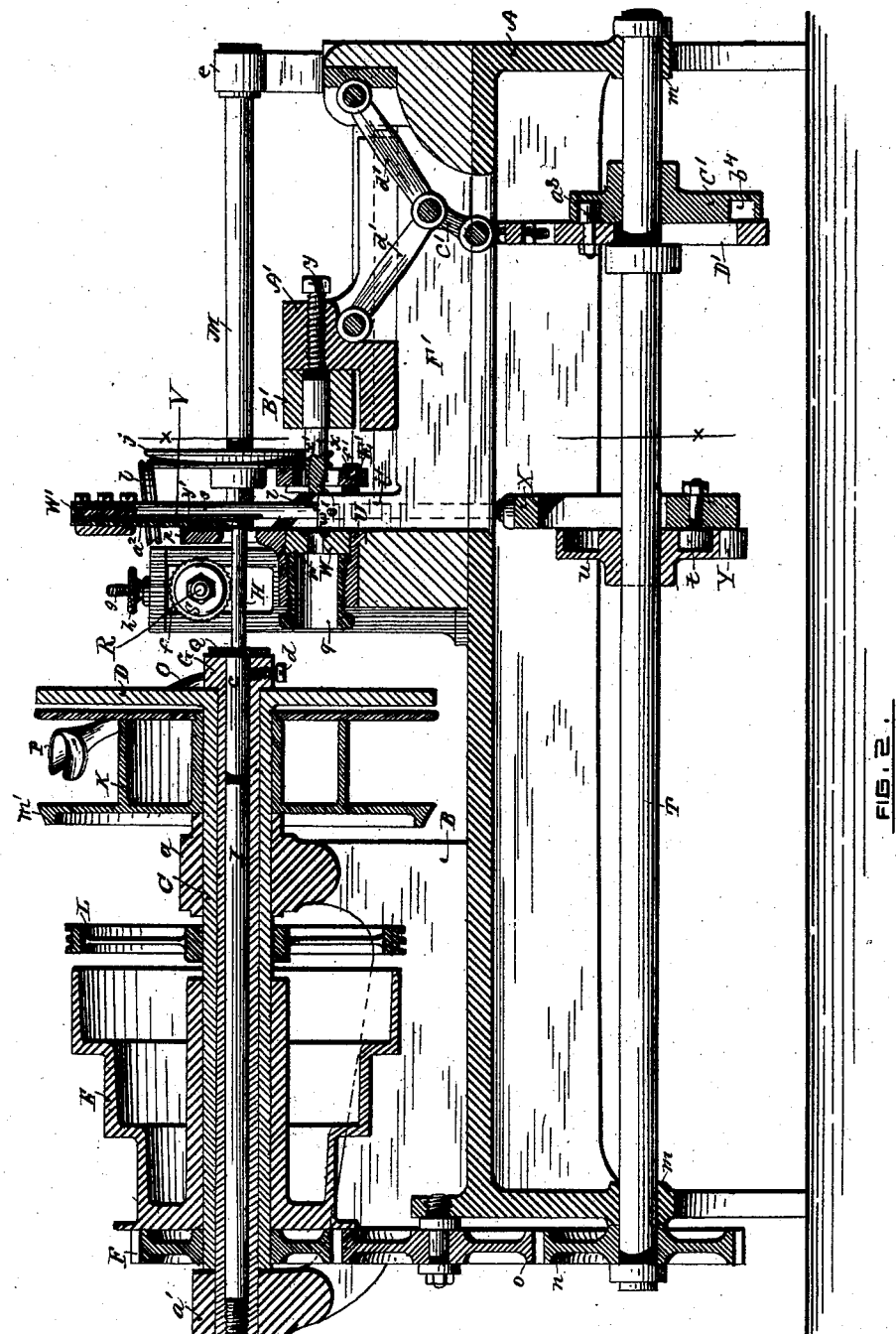
WITNESSES:
Chas. F. Schmelz
Socrates Scholfield
INVENTOR:
William A. Peck (No Model.) 4 Sheets—Sheet 3.
W. A. PECK.
MANUFACTURE OF RINGS OR CHAIN LINKS.
No. 367,923. Patented Aug. 9, 1887.
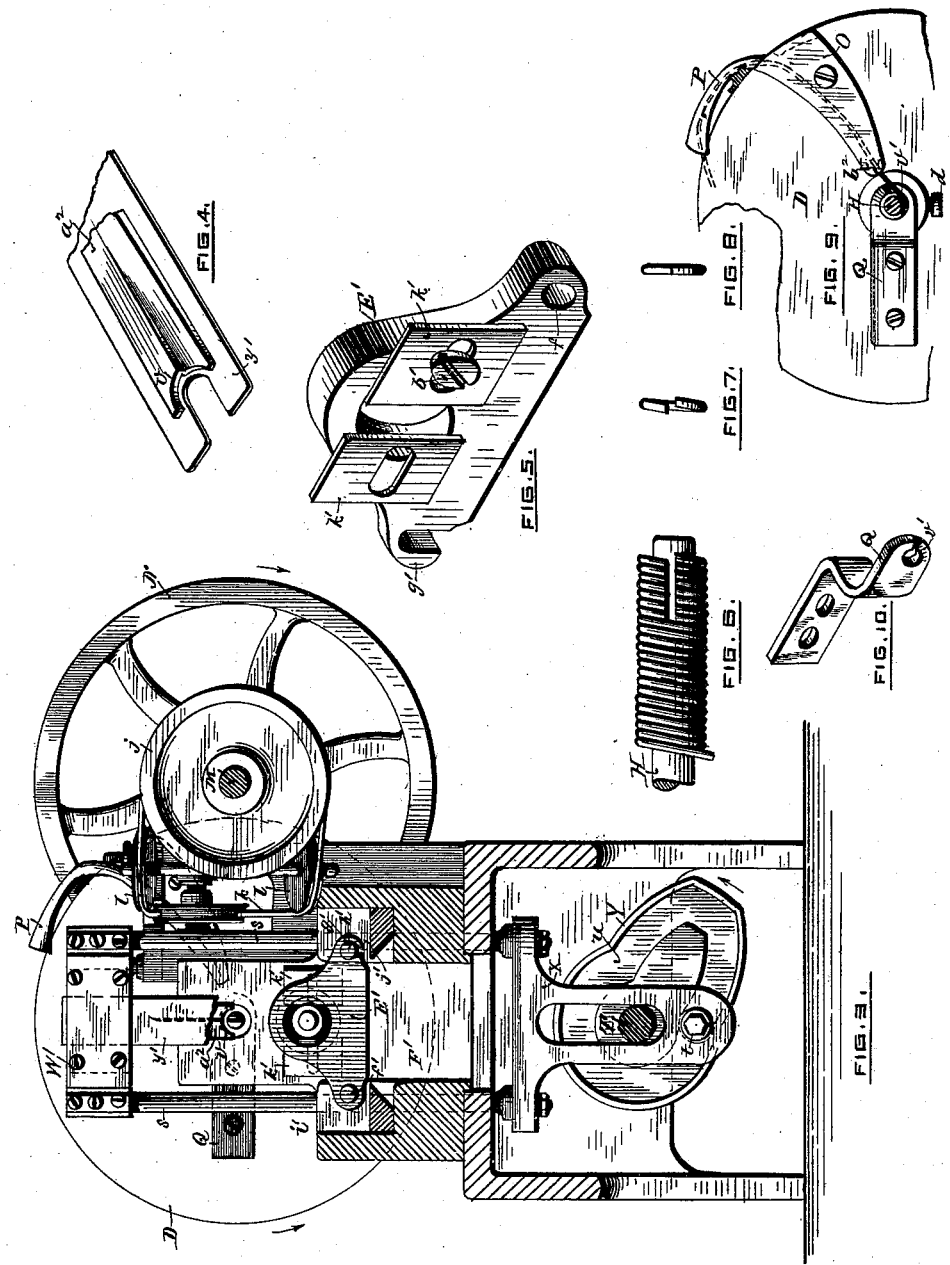

(No Model.) 4 Sheets—Sheet 4.

W. A. PECK.
MANUFACTURE OF RINGS OR CHAIN LINKS.

No. 367,923. Patented Aug. 9, 1887.

WITNESSES:
Chas. F. Schnek
Israel Plummer

INVENTOR:
William A. Peck
per S. Scholfield
attorney

UNITED STATES PATENT OFFICE.

WILLIAM A. PECK, OF PROVIDENCE, RHODE ISLAND.

MANUFACTURE OF RINGS OR CHAIN-LINKS.

SPECIFICATION forming part of Letters Patent No. 367,923, dated August 9, 1887.

Application filed August 16, 1884. Serial No. 140,773. (No model.)

*To all whom it may concern:*

Be it known that I, WILLIAM A. PECK, a citizen of the United States, residing at Providence, State of Rhode Island, have invented an Improvement in the Manufacture of Rings or Chain-Links, of which the following is a specification.

My invention relates to the manufacture of rings or chain-links from a continuous coil of wire; and it consists in the improved combination and arrangement of devices for winding, cutting, and swaging the links, as hereinafter fully set forth.

Figure 1 is a plan view of the machine. Fig. 2 is a longitudinal section of the same. Fig. 3 is a transverse section taken in the line $x\ x$ of Fig. 1. Figs. 4, 5, 9, 10, 11, 12, 13, and 14 are detail views. Fig. 6 represents the wire when coiled upon the mandrel and part of it cut to form the links. Fig. 7 represents the initial form of the link as separated from the coil. Fig. 8 shows the completely-closed link.

In the accompanying drawings, A represents the bed-frame of the machine, upon which is secured the head B, within the forward bearing, $a$, of which is placed the revolving hollow spindle C, provided at its forward end with a face-plate, D, and upon its rear portion, between the bearings $a\ a'$, is secured the cone-pulley E and gear F.

Within the bore of the hollow spindle C is placed the hollow spindle G, which is held stationary within the rear bearing, $a'$, by means of the clamping-screws $b\ b$, and within the bore of the stationary hollow spindle G is inserted the cylindrical shank $c$ of the winding-mandrel H, which is firmly held within the bore of the spindle G by means of the set-screw $d$.

At the rear of the shank $c$ of the mandrel, within the bore of the spindle G, is placed the loose bar I, and the rear end of the said spindle is provided with the screw J, which is adapted to effect the required longitudinal adjustment of the mandrel H.

Upon the spindle C, between the face-plate D and the bearing $a$, is placed the spool K, upon which the wire is to be wound preparatory to forming the chain-links, the spool being arranged loosely upon the spindle; and adjoining the pulley E upon the spindle C is placed the friction-gear L, which engages with the pinion L', arranged upon the shaft M, which is supported in the fixed bearings $e\ e$ and the adjustable intermediate bearing, $e^2$, and upon the rear end of the shaft M is placed the balance-wheel N.

Upon the front of the face-plate D, or of an equivalent support at the forward end of the hollow shaft C, is secured the guiding-clamp O, adapted for guiding the wire upon the mandrel, and to the edge of the face-plate is secured the curved guide P, adapted for guiding the wire from the spool K over the edge of the plate D. To the face-plate D is also secured the forcer Q, having a shank adapted for screw attachment to the plate, and a working-face, $v'$, encircling the mandrel, and made in spiral form, so as to coincide with the spiral form of the adjoining first coil of the wire. Fig. 11 shows a section of the wire coil as applied to the spirally-formed face $v'$ of the forcer, and a separate perspective view of the forcer is shown in Fig. 10.

Upon the front end of the arbor R, which is held in the vertically-adjustable bearings $f f$, is placed the cutter S, which serves to slit the spiral coil upon the mandrel to form the separate links shown in Fig. 7, the bearings $f\ f$ being operated for adjustment by means of the screw $g$ and milled nut $h$, and by reason of the vertical adjustability of the bearings $f f$ the cutter is made adapted for cutting the wire when wound upon mandrels of different sizes.

The cutter-arbor is driven by means of the scored pulley $i$, secured to the arbor, and the like pulley, $j$, secured to the shaft M, and the driving-band $k$, which passes around the edge of the intermediate guiding-pulleys, $l\ l$.

At the lower portion of the bed A is placed the cam-shaft T, which is held in the bearings $m\ m$, and driven from the gear F by means of the gear $n$, secured to the shaft T and the loose intermediate gear, $o$.

Figure 14:
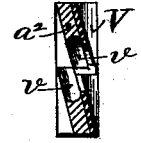

At the front face of the die-holding standard U, which is provided with a perforated arm, $p$, adapted to receive the forward end of the mandrel, is arranged the vertically reciprocating carrier V, which serves to transfer the partially-formed link, Fig. 7, downward to the swaging-die W. The position of the die W within the die-holder U is adjustably controlled by means of the annular screw $q$, the forward end of which serves to form a bearing-seat, r, for the swaging-die. The carrier V, which comprises a spirally-faced bar, $a^2$, and a link-holding spring, $y'$, is adjustably attached to the reciprocating head W', from which connection is made by means of the vertically-guided bars $s\ s$ with the slotted crosshead X, to one side of which is secured the friction-roll $t$, which is adapted to enter the groove $u$ of the operating-cam Y. The working-face $v$ of the carrier-bar $a^2$ is made in semispiral form, as shown in perspective in Fig. 4, and also in the sectional end view, Fig. 14, in order to properly fit the upper half of the periphery of the partially-formed link $s^2$, Fig. 13, which also shows a section of the divided lower end of the carrier-bar $a^2$, taken in a horizontal plane, $x'\ x'$, passing through the axis of the mandrel H; and Fig. 14 represents an upward view of the bar $a^2$ from the same horizontal plane.

Figures 12, 13:
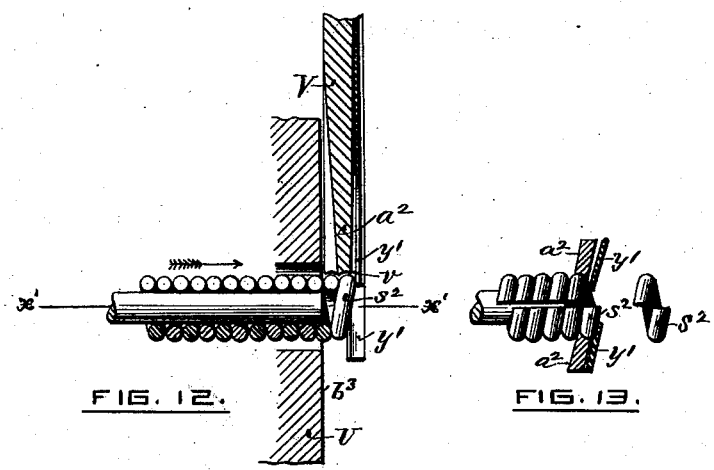

The downward movement of the carrier will serve to transport the link $s^2$ to the swaging-die W. The flat spring $y'$, which is secured to the outer side of the bar $a^2$ and divided longitudinally into two parts at its lower end, in order to bear firmly against the side of the unfinished link $s^2$, as shown in Fig. 13, will serve to hold the link against the vertical face $b^3$ of the die-holder, Fig. 12, during the downward movement of the carrier, and thus prevent the link from dropping away from the spiral socket-face $v$ of the carrier. To the reciprocating head A' is secured the tool-holder B', which is adapted to receive and hold the shank of the swaging-plunger $x$. At the rear of the reciprocating head A', and in the line of the axis of the swaging-plunger $x$, is placed the screw $y$, which serves to adjust the position of the forward end of the plunger with reference to that of the swaging-die.

The head A' is operated from the shaft T by means of the cam C' and the slotted bar D', which is provided at one side with a friction-roll, $a^3$, adapted to enter the groove $b^4$ of the cam, the link $c'$, and the toggle-levers $d'\ d'$.

To provide for the clearance of the finished links, Fig. 8, from the projecting spur $e'$ of the swaging-plunger, I arrange a clearing device, E', which is pivoted to the ear $i'$ of the slide-bed F', at the point $f''$, and provided with a hook end, $g'$, which passes over the fixed pin $h'$ upon the opposite ear, $j'$. To the side of the clearing device E' adjacent to the swaging-die are secured the slotted clearer-plates $k'\ k'$, which are adjustably secured to the holder E' by means of screws $b'$. The plates $k'\ k'$ are to be so adjusted as to clasp the opposite sides of the plunger $x$, so that upon the backward movement of the plunger the swaged link will be caught at its opposite edges by the adjacent edges of the plates $k'\ k'$, and the continued backward movement of the plunger will thereafter cause the removal of the finished link from the forwardly-projecting spur $e'$ of the swaging-plunger.

In order to first wind the wire for the links upon the loose spool K, I provide an inclined friction-edge, $m'$, upon the rear flange of the spool, and upon the balance-wheel shaft M is placed a correspondingly-inclined friction-wheel, $n'$, which is splined to the shaft between the collar $o'$ and the loose cam $p'$. The cam $p'$ is provided with a thumb-piece, $q'$, and is held from backward movement upon the shaft by means of a projecting pin, $r$, which extends diametrically through the shaft. The projecting hub $s'$ of the friction-wheel $n'$ is also provided with a cam-face, $t'$, adapted to fit the corresponding face of the cam $p'$, and between the friction-wheel $n'$ and collar $o'$ is placed the spiral spring $u'$, which serves to hold the friction-wheel $n'$ in engagement with the inclined flange of the spool, as shown in Fig. 1. The spool will thus be driven by the frictional contact of the inclined surfaces of the spool-flange and wheel $n'$, so that in case of the entanglement of the wire of the coil from which the spool is to be filled the consequent slipping of the driving-surfaces will relieve the wire from injurious strain until the entanglement can be corrected. When the spool K has been properly filled with wire, the cam $p$ is to be slightly rotated on the shaft by means of the projecting thumb-piece $q'$, thus causing a backward-sliding movement of the friction-wheel $n'$ against the forward action of the spring $u'$, which will cause the disengagement of the friction-wheel and spool. The wire from the spool K is now to be inserted into the open groove of the curved guide P, and from thence between the clamping-jaws $b^2 b^2$, which serve to guide the wire to the stationary mandrel. The wire passes around the mandrel in close proximity to the spiral face $v'$ of the forcer Q, and as the spirally-wound wire is forced forward along the mandrel it meets the edge of the revolving cutter, and is then divided into the spirally-formed links shown in Fig. 7, which, when forced to the end of the mandrel, will be caught under the spirally-formed end of the reciprocating bar $a^2$ of the carrier V and carried down to a position in front of the opening of the swaging-die W, the link being held against the face of the die-block on the downward movement of the carrier by means of the spring $y'$. Then as the swaging-plunger moves forward the spur $e'$ of the plunger enters the central opening of the spirally-formed link, which will then be carried into the swaging-die and be compressed between the shoulder $w'$ of the die and the corresponding shoulder, $x'$, of the plunger, thus causing the previously-open ends of the link to be closed and the sides of the same to be brought from a spiral to a plane, as shown in Fig. 8.

The diameter of the swaging-plunger is made a trifle less than that of the swaged link, so that upon the retrograde movement of the plunger the clearer-plates will cause the complete removal of the finished link, and in case of imperfect clearance, so that two links are caught at the same time between the plunger and die, the balance-wheel will still be allowed to revolve by the consequent slipping of the friction-gears, and the machine will thus be relieved from injurious strain.

The wire for suitable winding upon the mandrel should be in its soft annealed condition, and is started upon the mandrel by first holding the end of the wire firmly against the side of the mandrel and turning the spindle C in the proper direction for winding the wire, and after a certain length of wire has been wound, so that the coil will reach the edge of the cutter, the revolution of the coil upon the mandrel will be prevented by the side of the cutter; but when the mandrel is made in oval or fluted form, the shape of the mandrel will serve to prevent the coil from turning.

The wire employed may be of any desirable cross-section, and the stationary mandrel upon which it is wound to form the link may be of any desirable form of cross-section.

Instead of the reciprocating carrier above described, a continuously-revolving carrier may be employed, which revolving carrier can be readily driven from the shaft T, and in this case the openings in the carrier-disk or the engaging side of the arms of the carrier are to be provided with a spirally-formed face, and thus adapted for proper engagement with the partially-formed rings or links.

I claim as my invention—

1. The combination of the rotating hollow spindle, the loose spool upon the hollow spindle, and the stationary mandrel supported from within the bore of the said spindle, with the wire-guide, guiding-clamp, and forcer secured to the forward end of the hollow spindle and revolving therewith, substantially as described.

2. The combination of the rotating hollow spindle, the loose spool upon the hollow spindle, the stationary mandrel supported from within the bore of the said spindle, the guiding-clamp and forcer secured to the forward end of the hollow spindle and revolving therewith, and the revolving cutter adapted to divide the wire coil longitudinally into separate rings or links, substantially as described.

3. The combination of the rotating hollow spindle, the loose spool upon the hollow spindle, and the stationary mandrel supported from within the bore of the said spindle, the guiding-clamp and forcer secured to the forward end of the hollow spindle and revolving therewith, the swaging-die and reciprocating plunger, and means for transporting the partially-formed ring or link from the forward end of the mandrel to the swaging-die, substantially as described.

4. In a machine for making rings or chain-links, the combination of the rotating hollow spindle, the loose spool upon the hollow spindle, the stationary mandrel supported from within the bore of said spindle, the guiding-clamp and forcer secured to the forward end of the hollow spindle, the swaging die and plunger, means for transporting the partially-formed ring or link from the mandrel to the swaging-die, and the frictionally-geared balance-wheel shaft, whereby accidental injury to the machine is avoided, substantially as described.

5. In a machine for manufacturing rings or chain-links, the combination of the rotating hollow spindle, stationary mandrel supported from within the bore of the hollow spindle, the guiding-clamp and forcer secured to the forward end of the hollow spindle and revolving therewith, and the frictionally-driven loose spool upon the hollow spindle, substantially as described.

6. In a machine for making chain-links, the combination of a mandrel, a disk or support adapted to be revolved about said mandrel and provided with a reel or support for the wire to be wound, suitable means for causing the wire to wind closely about the mandrel, and a cutter for severing the convolutions of wire wound upon the mandrel, all substantially as described.

7. In a machine for making chain-links, the combination of a mandrel, a disk or support adapted to be revolved about said mandrel, and provided with a reel or support for the wire to be wound, suitable means for causing the wire to wind closely about the mandrel, a swaging-die to press the partially-formed link, and a carrier to transfer the partially-formed link from the mandrel to the swaging-die, all substantially as described.

8. In a machine for forming rings or chain-links out of wire, a fixed mandrel, a cutter arranged with its edge parallel with the axis of the mandrel, to sever the wire coils thereon, mechanism arranged for winding the wire on the mandrel and forcing it forward to the cutter, and carrying and swaging mechanisms, all substantially as described.

WILLIAM A. PECK.

Witnesses:
SOCRATES SCHOLFIELD,
CHAS. F. SCHMELZ.